Dec. 8, 1959     H. R. PERSON     2,916,667
LIGHTNING ARRESTER
Filed Aug. 23, 1957     2 Sheets-Sheet 1
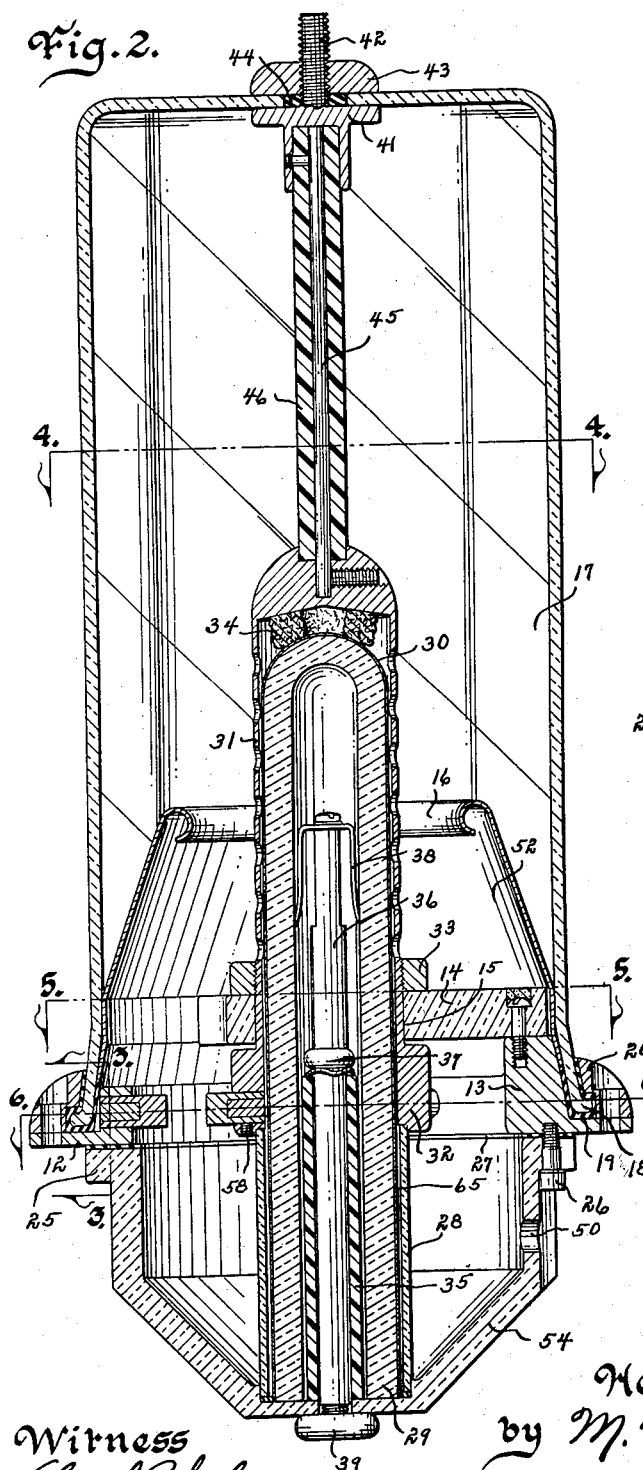
Inventor
Herman R. Person
by M. Talbert Dick
Attorney
Witness
Edward P. Seeley

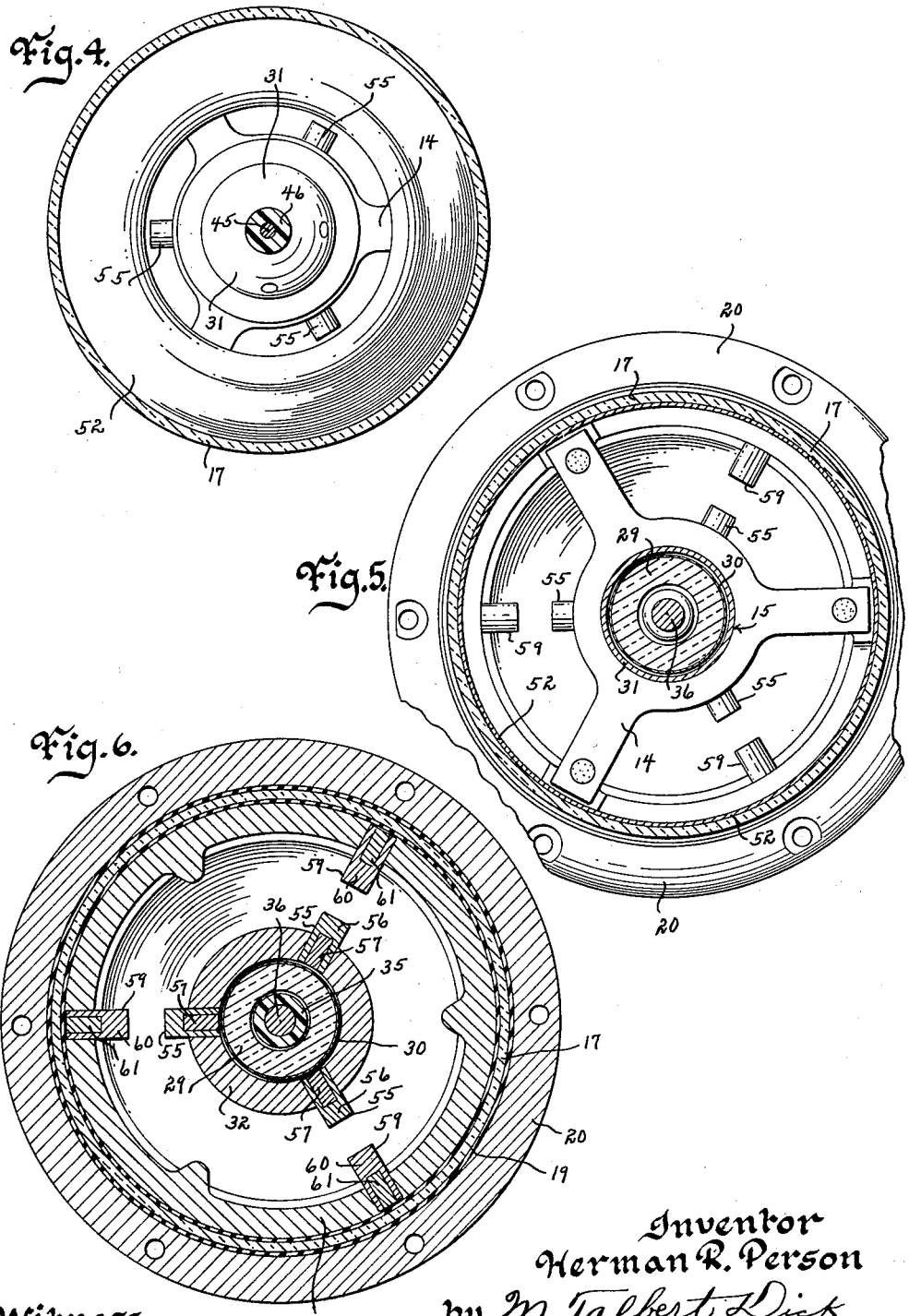

United States Patent Office 2,916,667
Patented Dec. 8, 1959

2,916,667

LIGHTNING ARRESTER

Herman R. Person, Columbus, Nebr., assignor to Dale Products Incorporated, Columbus, Nebr.

Application August 23, 1957, Serial No. 679,837

15 Claims. (Cl. 315—59)

This invention relates to lightning arresters and more particularly to a device for aircraft that will by-pass lightning away from certain of its electronic equipment.

It is not uncommon for lightning to strike aircraft in flight. Usually neither the aircraft per se nor the personnel are seriously harmed. However, it is quite common for expensive electronic equipment, such as radio, radar, electrical controls, and like, to be badly damaged by lightning. No only are such losses costly, but the aircraft is deprived of their usage until they are repaired or replaced. Some effort has been made to at least partially reduce these lightning hazards. Certain required standards for lightning arresters have been set, but most of these standards are most liberal because until now there was no equipment that could better the existing standards. As an illustration, lightning arresters herebefore were good for only one shock, i.e., once they were struck, they were burned out, and while the electronic equipment was saved, it could not be used until the burned out lightning arrester had been replaced. The spark-over of the spark gap was required to handle only ten thousand volts RF peak at 2 mc. The allowed shunt capacity was eighteen micromicrofarads. There is no minimum standard of allowable vibration or weight.

Therefore, one of the principal objects of my invention is to provide a lightning arrester for aircraft and like that is capable of withstanding a plurality of lightning strikes without replacement or adjustment, thereby permitting continued employment of the aircraft's electronic equipment.

A further object of this invention is to provide a lightning arrester for the electronic equipment of aircraft that is light in weight.

A still further object of my invention is to provide a lightning arrester for aircraft that lends itself to installation in the body, in the tail assembly, or in the nose section of the craft.

A still further object of this invention is to provide a lightning diverter for the electronic equipment of aircraft that permits visual observation to determine the extent of wear caused by one or more lightning strikes.

A still further object of my invention is to provide a lightning arrester that is sealed against dust, moisture and like.

A still further object of this invention is to provide a lightning arrester unit that is easily disassembled or assembled for purposes of inspection and/or repair.

Still further objects of my invention are to provide a lightning arrester for aircraft and like that is economical in manufacture, durable in use and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a side view of the device ready for use,

Fig. 2 is an enlarged longitudinal sectional view of the unit taken on line 2—2 of Fig. 1 and more fully illustrates its construction, Fig. 3 is an enlarged sectional view of one of the spark gap studs and is taken on line 3—3 of Fig. 2, Fig. 4 is a cross sectional view of the device taken on line 4—4 of Fig. 2, Fig. 5 is a cross sectional view of the unit taken on line 5—5 of Fig. 2, and Fig. 6 is a cross sectional view of my lightning arrester taken on line 6—6 of Fig. 2.

When installed, my device is imposed between the antenna of the aircraft and its electronic equipment. In the drawings I have used the numeral 10 to designate an antenna having the lead in wire 11 extending to the electronic equipment of the aircraft. It is in this lead wire 11 that I impose my unit and which I will now describe in detail.

The number 12 designates the metallic base ring having an inner collar portion 13 extending upwardly and inwardly, as shown in Fig. 2. Secured to the upper edge of the collar 13 is a non-metallic spanner bracket 14 having a center receiving hole 15 as shown in Fig. 5. Also secured to the upper outer area of the collar 13, and outside the bracket 14, is a metallic cone shaped corona shield 52. This member 52 extends upwardly and inwardly and has an inwardly and downwardly curved upper rim portion 16 to provide an enlarged opening as shown in Fig. 4. The numeral 17 designates an inverted transparent glass jar having a rim flange portion 18 resting on the top of the base ring 12. Imposed between the ring 12 and rim 18 is a rubber like gasket ring 19 which also extends above the rim 18. The numeral 20 designates a metallic holding ring engaging the gasket ring 19. The numeral 21 designates an open top jar having a rim flange portion 22 below the base ring 12. A sealing rubber like washer or O-ring 23 is imposed between the ring 12 and rim 22. The numeral 24 designates cap screws extending through the ring 20, the base ring 12, and threaded into the rim 22. The numeral 54 designates a non-metallic cup member having a flange rim 25. This member 54 is secured to the bottom of the base ring 12 by cap screws 26. A gasket rubber like ring 27 is imposed between the base ring and the rim flange 25. The numeral 28 designates a non-metallic pipe centrally mounted and extending upwardly from the bottom of the cup 54. The numeral 29 designates a non-metallic tube rounded and closed at its top as shown in Fig. 2. This tube 29 is positioned inside the pipe 28, and extends from the inside bottom of the cup 54 upwardly to terminate inside the glass jar 17. This domed tube is coated on its outside upper portion with a metallic coating 30, such as silver or like. The lower outer side of the member 29 is embraced by a resistor 65, as shown in Fig. 2. The numeral 31 designates a perforated metallic tube having a closed dome top and with its bottom terminating at the top of the pipe 28. This metal tube 31 loosely embraces the non-metal tube 29 and has an enlarged bottom base 32 below the spanner 14. The lower length of the tube 31 is tapered to tightly fit the hole 15 in the spanner 14. The numeral 33 designates a nut threaded on the tube 31 and engaging the top of the spanner bracket 14. The numeral 34 designates a metallic conductor such as metal wool between the inside top of the tube 31 and the outside top of the tube 29. The numeral 35 designates a rubber tube inside the lower end portion of the tube 29. The numeral 36 designates a metallic rod extending through the rubber tube 35 and through the bottom of the cup 54. The numeral 37 designates a stop ring on the rod 36 engaging the top of the rubber tube 35. The numeral 38 designates metallic spring fingers on the top of the rod 36 yieldingly engaging the inside of the non-metallic tube 29. The numeral 39 designates a metallic nut threaded onto the lower end of the rod 36 and below the cup 54. The numeral 41 designates a metallic fitting inside the top of the jar 17 and having a threaded shaft 42 extending upwardly through the top of the inverted jar 17. The numeral 43 designates a nut above the jar 17 and threaded onto the shaft 42. A sealing gasket 44 is positioned around the shaft and between the fitting 41 and nut 43. The numeral 45 designates a metal conductor rod secured to the fitting 41 and the top of the metallic tube 31. This rod 45 is embraced by insulation 46. The numeral 47 designates a bracket inside the jar 21. The numeral 48 designates a spring loaded metallic contact member on the bracket 47 and yieldingly engaging the contact nut 39. When installed the electric cable 11 is severed and one end attached to the shaft 42 and the other end attached to the contact member 48, as shown in Fig. 1. The numeral 49 designates an air valve extending through the jar 21. The numeral 50 designates an air passageway extending through the cup 54 and communicating with the inside of the inverted jar 17 and the inside of the jar 21.

I employ three spark gaps in my device. Therefore, there will be three evenly spaced apart pairs of spaced studs and, inasmuch as each pair is identical to the other two pairs, the description of one pair will be that of all three pairs. Radially outwardly extending from the base 32 of the tube 31 are three studs generally designated by the numeral 55. Each stud is of brass 56 having a tungsten core rod 57. The outer end of the stud is all brass as shown in Fig. 6. These three studs are detachably held in place by screws 58 threaded in the base 32. Radially inwardly extending from the collar 13 of the base ring 12 are three receiving studs generally designated by the numeral 59. These receiving studs 59 are similar to the studs 55 and are of brass 60 having a core rod of tungsten 61. The inner ends of each of these studs 59 are of brass. The studs 55 and studs 59 are arranged directly opposite from each other, respectively, and in spaced relation to provide the three spark gaps, as shown in Fig. 5. The studs 59 are detachably secured to the collar 13 by screws 63 as shown in Fig. 3.

Normally, electronic impulses will be picked up by the antenna 10, passed to the terminal shaft 42, thence to the fitting 41, thence to the rod 45, thence to the metal tube 31, thence through the metal wool 34, thence to the tube 29, where it is picked up by the metallic fingers 38, thence through the metallic shaft rod 36, and thence through the lower cable 11 to the electronic equipment. Therefore, my lightning arrester is placed in series with the lead in of the antenna and the electric equipment of the aircraft, with the ring 12 grounded to the aircraft frame. By the arrangement of parts of my device, the same will withstand severe vibration and jolts because of the mounting of the capacitor, which is the heavy part of the arrester near its center of gravity.

When the antenna is hit by lightning, the current from the lightning flows down the antenna lead to the threaded shaft 42, thence to the fixture 41, thence to the metal rod 45, and thence to the metal tube 31. From the tube 31 the lightning current will jump from the studs 55 to the studs 59 and thence through the collar 13 and ring 12, to the frame of the aircraft, thus by-passing the rod 36 which is in electrical contact with the electronic equipment of the aircraft. The spark over of the spark gap between the studs is 15,000 volts RF peak at 2 mc. The shunt capacity of the unit is only 11 micromicrofarads. The unit will withstand a higher voltage of 18,000 volts peak at 2 mc. applied from the antenna terminal to ground while the arrester is at an altitude of 75,000 feet. The glass encased unit is tightly sealed, as shown in the drawings. I recommend that the unit have a pressure of five pounds per cubic inch at sea level.

The air may be injected through the valve 49, and will pass into the inverted glass jar 17, through the passageway 50. With a lightning strike, the current charges the capacitor until the voltage across the capacitor reaches the spark over voltage of the spark gaps between the studs. The charging of this series capacitor and the D.C. resistor of 1 megohm across the capacitor allow some current to flow to the electrical equipment. However, the current is very low and therefore does not harm the equipment. After the capacitor is charged to the spark over voltage of the spark gaps, the spark gaps are then arced over and the lightning current follows this very low resistance path from the antenna to the aircraft frame. During this lightning spark over across the spark gaps the brass of the studs will vaporize and thus be burned back. The vaporized material from the studs will be coating other parts of the lightning arrester; however, due to the fact that this vaporized material is not electro conductive, it does not cause a short circuit from the antenna terminal to the ground frame of the aircraft. By having each of the studs of tungsten, embraced by brass, the progressive vaporizing of the brass will not leave any sharp points, which would be the case if the studs were totally of tungsten. In other words, if the studs were totally of tungsten, the burning of the same would immediately produce sharp points, which would cause the spark over voltage of the spark gaps to decrease seriously. With my structure, the device will by-pass six lightning strokes before the brass will be vaporized to expose the tungsten cores. The tungsten has a higher melting point and this develops sharp points into the spark gaps which decrease the RF spark over voltage. Therefore, and because of this structure, my lightning arrester may be subjected to a considerable number of lightning strikes before repair and/or replacement and, in the intervals between the lightning strikes, the device will function to deliver electrical impulses from the antenna to the electronic equipment of the aircraft.

After extensive use, and after the aircraft has been struck with lightning a number of times, one can easily observe through the inverted glass jar 17 the condition of the studs 55 and 59. Still another method of observing the progressive use of the device is to observe the amount of vaporized brass which will adhere to the inside of the jar 17 to parts therein. The metallic wool 34 between the two domed tubes makes excellent electrical contact and also serves as a shock absorber and anti-vibration means between the two members. The capacitor 29 in use follows standard known principles of passing electrical impulses. By being of ceramic material with a metal plate at each side it will pass, as is well known, alternating electrical currents but will not pass direct currents. The metallic coat 30 and the metallic fingers 38 provide the metallic plates at each side of the ceramic material and therefore electric alternating impulses will be passed from the antenna to the electronic equipment. However, direct current charges, such as that of electricity, will not pass the ceramic tube 29 but instead will follow through the metallic tube 31 and jump the spark gaps to the frame of the aircraft. Thus, the capacitor 29 will select and direct alternating impulses to the electronic equipment and will reject lightning charges.

However, in the flying of any type of aircraft through the atmosphere, certain static electricity is picked up and normally the same would not jump the spark gaps. Therefore, to bleed off any such static from the line leading to the electronic equipment, I have provided the resistor 65 embracing the lower portion of the ceramic tube 29.

Any standard means may be used for sealing the unit so that the pressure inside the jar 17 may be effected and maintained.

Herebefore I have referred to the studs as being composed of a brass case and a tungsten core. Obviously, the case of the studs may be made of any suitable metallic conductor having a relatively low melting point and with the core of the studs of a much higher melting point.

Some changes may be made in the construction and arrangement of my lightning arrester without departing from the real spirit and purpose of my invention, and it is my intention to cover by my claims, any modified forms of structure or use of mechanical equivalents which may be reasonably included within their scope.

I claim:

1. In a lightning arrester, a metallic base ring adapted to be electrically grounded, a metal surfaced ceramic tube extending through said base ring, a metallic tube loosely embracing said ceramic tube, an electrical contact means connecting said metal tube with the metal surface of said ceramic tube, an electric lead means connected to said metallic tube and adapted to pass both a lightning charge and an electrical impulse to said metallic tube, an electrical contact means engaging the inside of said ceramic tube and adapted to be electrically connected to electronic equipment, at least one metallic stud on said base ring, and at least one metallic stud on said metallic tube and in spaced relation to said first stud.

2. In a lightning arrester, a metallic base ring adapted to be electrically grounded, a metal surfaced ceramic tube extending through said base ring, a metallic tube loosely embracing said ceramic tube, an electrical contact means of metallic wool connecting said metal tube with the metal surface of said ceramic tube, an electric lead means connected to said metallic tube and adapted to pass both a lightning charge and an electrical impulse to said metallic tube, an electrical contact means engaging the inside of said ceramic tube and adapted to be electrically connected to electronic equipment, at least one metallic stud on said base ring, and at least one metallic stud on said metallic tube and in spaced relation to said first stud.

3. In a lightning arrester, a metallic base ring adapted to be electrically grounded, a metal surfaced ceramic tube extending through said base ring, a perforated metallic tube loosely embracing said ceramic tube, an electrical contact means connecting said metal tube with the metal surface of said ceramic tube, an electric lead means connected to said metallic tube and adapted to pass both a lightning charge and an electrical impulse to said metallic tube, an electrical contact means engaging the inside of said ceramic tube and adapted to be electrically connected to electronic equipment, at least one metallic stud on said base ring, and at least one metallic stud on said metallic tube and in spaced relation to said first stud.

4. In a lightning arrester, a metallic base ring adapted to be electrically grounded, a metal surfaced ceramic tube extending through said base ring, a metallic tube loosely embracing said ceramic tube, an electrical contact means connecting said metal tube with the metal surface of said ceramic tube; said two tubes each having a closed domed top and said electrical contact means comprising metallic wool positioned between the outside dome of said ceramic tube and the inside dome of said metallic tube, an electric lead means connected to said metallic tube and adapted to pass both a lightning charge and an electrical impulse to said metallic tube, an electrical contact means engaging the inside of said ceramic tube and adapted to be electrically connected to electronic equipment, at least one metallic stud on said base ring, and at least one metallic stud on said metallic tube and in spaced relation to said first stud.

5. In a lightning arrester, a metallic base ring adapted to be electrically grounded, a metal surfaced ceramic tube extending through said base ring, a metallic tube loosely embracing said ceramic tube, an electrical contact means connecting said metal tube with the metal surface of said ceramic tube, an electric lead means connected to said metallic tube and adapted to pass both a lightning charge and an electrical impulse to said metallic tube, an electrical contact means engaging the inside of said ceramic tube and adapted to be electrically connected to electronic equipment, at least one metallic stud on said base ring, and at least one metallic stud on said metallic tube and in spaced relation to said first stud; said metallic studs each comprising a brass jacket and a tungsten core.

6. In a lightning arrester, a metallic base ring adapted to be electrically grounded, a metal surfaced ceramic tube extending through said base ring, a metallic tube loosely embracing said ceramic tube, an electrical contact means connecting said metal tube with the metal surface of said ceramic tube, an electric lead means connected to said metallic tube and adapted to pass both a lightning charge and an electrical impulse to said metallic tube, an electrical contact means engaging the inside of said ceramic tube and adapted to be electrically connected to electronic equipment, at least one metallic stud on said base ring, and at least one metallic stud on said metallic tube and in spaced relation to said first stud; said metallic studs each having its outer side and adjacent end of brass and its core of tungsten.

7. In a lightning arrester, a metallic base ring adapted to be electrically grounded, a metal surfaced ceramic tube extending through said base ring, a metallic tube loosely embracing said ceramic tube, an electrical contact means connecting said metal tube with the metal surface of said ceramic tube, an electric lead means connected to said metallic tube and adapted to pass both a lightning charge and an electrical impulse to said metallic tube, an electrical contact means having metallic spring fingers engaging the inside of said ceramic tube and adapted to be electrically connected to electronic equipment, at least one metallic stud on said base ring, and at least one metallic stud on said metallic tube and in spaced relation to said first stud.

8. In a lightning arrester, a metallic base ring adapted to be electrically grounded, a metal surfaced ceramic tube extending through said base ring, a metallic tube loosely embracing said ceramic tube, an electrical contact means connecting said metal tube with the metal surface of said ceramic tube, an electric lead means connected to said metallic tube and adapted to pass both a lightning charge and an electrical impulse to said metallic tube, an electrical contact means engaging the inside of said ceramic tube and adapted to be electrically connected to electronic equipment, at least one metallic stud on said base ring, at least one metallic stud on said metallic tube and in spaced relation to said first stud, and an inverted jar on said base ring embracing at least the upper portions of said tubes.

9. In a lightning arrester, a metallic base ring adapted to be electrically grounded, a metal surfaced ceramic tube extending through said base ring, a metallic tube loosely embracing said ceramic tube, an electrical contact means connecting said metal tube with the metal surface of said ceramic tube, an electric lead means connected to said metallic tube and adapted to pass both a lightning charge and an electrical impulse to said metallic tube, an electrical contact means engaging the inside of said ceramic tube and adapted to be electrically connected to electronic equipment, at least one metallic stud on said base ring, at least one metallic stud on said metallic tube and in spaced relation to said first stud, and an inverted glass jar on said base ring embracing at least the upper portions of said tubes.

10. In a lightning arrester, a metallic base ring adapted to be electrically grounded, a metal surfaced ceramic tube extending through said base ring, a metallic contact loosely embracing said ceramic tube, an electrical contact means connecting said metal tube with the metal surface of said ceramic tube, an electric lead means connected to said metallic tube and adapted to pass both a lightning charge and an electrical impulse to said metallic tube, an electrical contact means engaging the inside of said ceramic tube and adapted to be electrically connected to electronic equipment, at least one metallic stud on said base ring, at least one metallic stud on said metallic tube and in spaced relation to said first stud, an inverted glass jar on said base ring embracing at least the upper portions of said tubes, and a corona shield inside said jar and embracing said studs and said tubes.

11. In a lightning arrester, a metallic base ring adapted to be electrically grounded, a metal surfaced ceramic tube extending through said base ring, a metallic tube loosely embracing said ceramic tube, an electrical contact means connecting said metal tube with the metal surface of said ceramic tube, an electric lead means connected to said metallic tube and adapted to pass both a lightning charge and an electrical impulse to said metallic tube, an electrical contact means engaging the inside of said ceramic tube and adapted to be electrically connected to electronic equipment, a plurality of radially inwardly extending metallic studs on said base ring, and a plurality of radially outwardly extending metallic studs on said metal tube spaced apart from said plurality of first mentioned studs, respectively.

12. In a lightning arrester, a metallic base ring adapted to be electrically grounded, a metal surfaced ceramic tube extending through said base ring, a metallic tube loosely embracing said ceramic tube, an electrical contact means connecting said metal tube with the metal surface of said ceramic tube, an electric lead means connected to said metallic tube and adapted to pass both a lightning charge and an electrical impulse to said metallic tube, an electrical contact means engaging the inside of said ceramic tube and adapted to be electrically connected to electronic equipment, a plurality of evenly spaced apart radially inwardly extending metallic studs on said base ring, and a plurality of evenly spaced apart radially outwardly extending metallic studs on said metal tube spaced apart from said plurality of first mentioned studs, respectively.

13. In a lightning arrester, a metallic base ring adapted to be electrically grounded, a metal surfaced ceramic tube extending through said base ring, a metallic tube loosely embracing said ceramic tube, an electrical contact means connecting said metal tube with the metal surface of said ceramic tube, an electric lead means connected to said metallic tube and adapted to pass both a lightning charge and an electrical impulse to said metallic tube, an electrical contact means engaging the inside of said ceramic tube and adapted to be electrically connected to electronic equipment, at least one metallic stud on said base ring, at least one metallic stud on said metallic tube and in spaced relation to said first stud, and an inverted jar on said base ring embracing at least the upper portions of said tubes; said jar being tightly sealed on said base ring and adapted to have a pressure greater than that of atmospheric pressure.

14. In a lightning arrester, a metallic base ring adapted to be electrically grounded, a metal surfaced ceramic tube extending through said base ring, a metallic tube loosely embracing said ceramic tube, an electrical contact means connecting said metal tube with the metal surface of said ceramic tube, an electric lead means connected to said metallic tube and adapted to pass both a lightning charge and an electrical impulse to said metallic tube, an electrical contact means engaging the inside of said ceramic tube and adapted to be electrically connected to electronic equipment, at least one metallic stud on said base ring, at least one metallic stud on said metallic tube and in spaced relation to said first stud, an inverted glass jar on said base ring embracing at least the upper portions of said tubes, and a corona shield inside said jar and embracing said studs and said tubes; said jar being tightly sealed on said base ring and adapted to have a pressure greater than that of atmospheric pressure.

15. In a lightning arrester, a metallic base ring adapted to be electrically grounded, a ceramic tube having its outer upper portion metallically coated and extending through said base ring, a resistance embracing the outer lower end portion of said ceramic tube, a metallic tube loosely embracing said ceramic tube, an electrical contact means connecting said metal tube with the metal surface of said ceramic tube, an electric lead means connected to said metallic tube and adapted to pass both a lightning charge and an electrical impulse to said metallic tube, an electrical contact means engaging the inside of said ceramic tube and adapted to be electrically connected to electronic equipment, a plurality of evenly spaced apart radially inwardly extending metallic studs on said base ring, and a plurality of evenly spaced apart radially outwardly extending metallic studs on said metal tube spaced apart from said plurality of first mentioned studs, respectively.

References Cited in the file of this patent

UNITED STATES PATENTS

| | | |
|---|---|---|
| 1,152,272 | Boas | Aug. 31, 1915 |
| 1,322,610 | Pfanstiehl | Nov. 25, 1919 |
| 1,754,158 | Goodwin | Apr. 8, 1930 |
| 2,470,033 | Hensel | May 10, 1949 |